(12) United States Patent
Lin et al.

(10) Patent No.: US 8,626,963 B2
(45) Date of Patent: Jan. 7, 2014

(54) PACKET BASED DATA TRANSFER SYSTEM AND METHOD FOR HOST-SLAVE INTERFACE

(75) Inventors: Chu-Ming Lin, Hsinchu (TW);
Chiao-Chi Huang, Zhubei (TW);
Chien-Kuang Lin, Zhubei (TW);
Yu-Tin Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 71 days.

(21) Appl. No.: 12/773,660

(22) Filed: May 4, 2010

(65) Prior Publication Data

US 2011/0276730 A1   Nov. 10, 2011

(51) Int. Cl.
*G06F 3/00* (2006.01)
*G06F 13/28* (2006.01)
*G06F 13/00* (2006.01)

(52) U.S. Cl.
USPC ........ 710/22; 710/5; 710/20; 710/21; 710/24; 710/28; 710/107

(58) Field of Classification Search
USPC ................................ 710/1–22, 24, 28, 107, 5
See application file for complete search history.

(56) References Cited

U.S. PATENT DOCUMENTS

| | | | |
|---|---|---|---|
| 5,014,265 A | 5/1991 | Hahne et al. | |
| 5,155,830 A | 10/1992 | Kurashige | |
| 5,638,535 A | 6/1997 | Rosenthal et al. | |
| 5,644,594 A | 7/1997 | Johnson et al. | |
| 5,797,033 A | 8/1998 | Ecclesine | |
| 6,044,225 A * | 3/2000 | Spencer et al. | 710/52 |
| 6,201,813 B1 | 3/2001 | Klausmeier et al. | |
| 6,609,167 B1 | 8/2003 | Bastiani et al. | |
| 6,662,280 B1 | 12/2003 | Hughes | |
| 6,714,553 B1 * | 3/2004 | Poole et al. | 370/412 |
| 7,012,913 B2 | 3/2006 | Maturi | |
| 7,035,948 B1 | 4/2006 | Liang et al. | |
| 7,342,941 B2 * | 3/2008 | Jungers et al. | 370/471 |
| 7,460,766 B2 * | 12/2008 | Heo et al. | 386/239 |
| 7,620,749 B2 * | 11/2009 | Biran et al. | 710/22 |
| 7,840,722 B2 * | 11/2010 | Goh et al. | 710/33 |
| 2006/0288129 A1 * | 12/2006 | Pope et al. | 710/22 |
| 2007/0118677 A1 * | 5/2007 | Swartzentruber et al. | 710/316 |
| 2008/0037543 A1 * | 2/2008 | Sala et al. | 370/392 |
| 2008/0301697 A1 * | 12/2008 | Southgate et al. | 718/105 |

(Continued)

FOREIGN PATENT DOCUMENTS

| | | |
|---|---|---|
| CN | 1713164 | 12/2005 |
| CN | 101335667 | 12/2008 |
| TW | 437223 | 5/2001 |

*Primary Examiner* — Ernest Unelus
*Assistant Examiner* — Getente A Yimer
(74) *Attorney, Agent, or Firm* — Chen Yoshimura LLP (57) ABSTRACT

In a host-slave data transfer system, the slave device receives packet based data from an external device and stores the packet content in a buffer as data segments. The slave merges a plurality of data segments into data streams and transmits the data streams to the host. The host uses direct memory access (DMA) to unpack the data stream from the slave into individual data segments without memory copy. To enable the host to set up DMA, the slave transmits information regarding sizes of the data segments to the host beforehand via an outband channel, e.g. by transmitting the size information in headers and/or tailers inserted into previous data streams. The host utilizes the data segment size information to program descriptor tables, such that each descriptor in the descriptor tables causes one data segment in the data stream to be stored in the system memory of the host.

18 Claims, 6 Drawing Sheets

(56) References Cited

U.S. PATENT DOCUMENTS

| | | |
|---|---|---|
| 2009/0216914 A1* | 8/2009 | Kyusojin et al. ............... 710/22 |
| 2009/0216937 A1* | 8/2009 | Yasufuku ..................... 711/103 |
| 2009/0259786 A1* | 10/2009 | Lin et al. ..................... 710/110 |
| 2009/0327533 A1* | 12/2009 | Kallam et al. ................. 710/25 |
| 2011/0167189 A1* | 7/2011 | Matsubara et al. ........... 710/308 |

* cited by examiner

| State Name | Operation |
|---|---|
| ST_FDS (Fetch Descriptor) | ADMA2 fetches a descriptor line and set parameters in internal registers. Next go to ST_CADR state. |
| ST_CADR (Change Address) | Link operation loads another Descriptor address to ADMA System Address register. In other operations, ADMA System Address register is incremented to point next descriptor line. If End=0, go to ST_TFR state. ADMA2 shall not be stopped at this state even if some errors occur. |
| ST_TFR (Transfer Data) | Data transfer of one descriptor line is executed between system memory and SD card. If data transfer continues (End=0) go to ST_FDS state. If data transfer completes, go to ST_STOP state. |
| ST_STOP (Stop DMA) | ADMA2 stays in this state in following cases: (1) After Power on reset or software reset. (2) All descriptor data transfers are completed If a new ADMA2 operation is started by writing Command register, go to ST_FDS state. |

Fig. 3c

PACKET BASED DATA TRANSFER SYSTEM AND METHOD FOR HOST-SLAVE INTERFACE

BACKGROUND OF THE INVENTION

1. Field of the Invention

The present invention relates to a data transfer method and related apparatus in a host-slave interface. In particular, it provides a data transfer method in which the host uses direct memory access to unpack a stream of data containing multiple data units received from the slave without memory copy.

2. Description of the Related Art

SDIO (Secure Digital Input Output) is an interface that uses the SD (Secure Digital) card form factor for devices other than flash memory cards. Such devices (the slave device in the SDIO interface) may include GPS receivers, Wi-Fi or Bluetooth adapters, modems, Ethernet adapters, barcode readers, IrDA adapters, FM radio tuners, TV tuners, RFID readers, digital cameras, mass storage media such as hard drives, etc. The host devices (the master in the SDIO interface) that support SDIO may be PDAs (personal digital assistants), laptop computers, cell phones ("smart phones"), etc.

In a conventional host-slave system using the SDIO interface, the host device controls data transfer, and the slave device can only move data according to the host's request. The slave device cannot initiate data transfer. In data transfer, there is a time delay between the request sending of the host device and the request receiving of the slave device, and likewise there is a time delay between the response sending of the slave device and the response receiving of the host device. Such a situation is called inter-command delay. Because the slave device must wait for the host to request data, inter-command delay associated with the request command causes delay in data transfer. The inter-command delay may be as much as hundreds of microseconds.

SUMMARY OF THE INVENTION

The present invention is directed to an SDIO or other host-slave system and related method where the slave transfers a data stream containing multiple data segments and the host device employs direct memory access (DMA) to unpack the data segments into individual data segments.

An object of the present invention is to provide an efficient data transfer method for an SDIO or other host-slave interface.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a data transfer method implemented in a host-slave data transfer system, the slave being in data communication with an external device, the method including: (a) the slave receiving data from the external device and storing the received data in a buffer of the slave, the data comprising a plurality of data segments; (b) the slave obtaining data segment size information specifying sizes of each of the plurality of data segments; (c) the slave transmitting the data segment size information to the host via an outband channel; (d) the host receiving the data segment size information from the slave via the outband channel; (e) the host generating one or more descriptor tables comprising a plurality of descriptors each defining a data transfer between the slave and a system memory of the host, each of the plurality of descriptors specifying an address in the system memory and a length of data to be transferred, wherein the lengths specified in the descriptors are based on the data segment size information received from the slave; (f) the host issuing a data transfer command to the slave to transfer the plurality of data segments; (g) in response to the data transfer command, the slave transferring the plurality of data segments as a data stream; and (h) the host executing direct memory access according to the descriptor tables to store individual ones of the plurality of data segments contained in the data stream in the system memory of the host at the specified addresses.

In another aspect, the present invention provides a data transfer method implemented in a host-slave data transfer system, the slave being in data communication with an external device, the method including: (a) the slave receiving data from the external device and storing the received data in a buffer of the slave, the data comprising a first plurality of data segments and a second plurality of data segments; (b) the slave obtaining data segment size information specifying sizes of each of the second plurality of data segments; (c) in response to a first data transfer command from the host, the slave generating and transmitting to the host a first data stream, the first data stream containing the first plurality of data segments and a plurality of auxiliary segments, wherein the auxiliary segments include the data segment size information which specifies sizes of the second plurality of data segments; (d) the host receiving the first data stream and obtaining data segment size information from the plurality of auxiliary segments; (e) the host generating one or more descriptor tables comprising a plurality of descriptors each defining a data transfer between the slave and a system memory of the host, each of the plurality of descriptors specifying an address in the system memory and a length of data to be transferred, wherein the lengths specified in the descriptors are based on the data segment size information obtained in step (d); (f) the host issuing a second data transfer command to the slave to transfer the second plurality of data segments as a data stream; (g) in response to the second data transfer command, the slave transferring the second plurality of data segments in a second data stream; and (h) the host executing direct memory access according to the descriptor tables to store individual ones of the second plurality of data segments contained in the second data stream in the system memory of the host at the specified addresses.

In another aspect, the present invention provides a data transfer method implemented in a host of a host-slave system, the method including: receiving one or more data streams from the slave, the data streams containing a first plurality of data segments and a plurality of auxiliary segments; obtaining data segment size information from at least a portion of the plurality of auxiliary segments, the data segment size information specifying sizes of a second plurality of data segments stored in the slave; generating one or more descriptor tables comprising a plurality of descriptors each defining a data transfer between the slave and a system memory of the host, each of the plurality of descriptors specifying an address in the system memory and a length of data to be transferred, wherein the lengths specified in the descriptors are based on the data segment size information; issuing a transfer command to the slave to transfer the second plurality of data segments as a data stream; executing direct memory access according to the descriptor tables to store individual ones of the second plurality of data segments in the data stream from the slave in the system memory of the host at the specified addresses.

In another aspect, the present invention provides a host device in a host of a host-slave system, which includes: a processor; and a system memory storing data and program code executed by the processor, the program code being configured to cause the processor to execute a the data transfer process which includes: receiving one or more data streams from the slave, the data streams containing a first plurality of data segments and a plurality of auxiliary segments; obtaining data segment size information from at least a portion of the plurality of auxiliary segments, the data segment size information specifying sizes of a second plurality of data segments stored in the slave; generating one or more descriptor tables comprising a plurality of descriptors each defining a data transfer between the slave and the system memory of the host, each of the plurality of descriptors specifying an address in the system memory and a length of data to be transferred, wherein the lengths specified in the descriptors are based on the data segment size information; issuing a transfer command to the slave to transfer the second plurality of data segments as a data stream; executing a direct memory access according to the descriptor tables to store individual ones of the second plurality of data segments in the data stream from the slave in the system memory of the host at the specified addresses.

In another aspect, the present invention provides a slave device adapted for connecting to a host device in a host-slave system for communicating data between the host device and an external device, which includes: a buffer for storing data received from the external device, the data comprising a first plurality of data segments and a second plurality of data segments; a control circuit coupled to the buffer for obtaining data segment size information specifying sizes of each of the second plurality of data segments in the buffer; and a merging circuit coupled to the buffer and the control circuit, for generating a data stream and transferring the data stream to the host device in response to a data transfer command from the host device, the data stream containing the first plurality of data segments and a plurality of auxiliary segments, wherein the auxiliary segments include the data segment size information.

In another aspect, the present invention provides a method implemented in a slave device of a host-slave system to facilitate communication of data between the host device and an external device, which includes: storing data received from the external device in a buffer of the slave device, the data comprising a first plurality of data segments and a second plurality of data segments; obtaining data segment size information specifying sizes of each of the second plurality of data segments in the buffer; and generating a data stream and transferring the data stream to the host device in response to a data transfer command from the host device, the data stream containing the first plurality of data segments and a plurality of auxiliary segments, wherein the auxiliary segments include the data segment size information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3b and 3c illustrate the operation of ADMA2.

FIGS. 4 and 5 are flow charts illustrating a data transfer method according to an embodiment of the present invention.

DETAILED DESCRIPTION OF THE PREFERRED EMBODIMENTS

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Commonly owned U.S. patent application Ser. No. 12/339,072, published as US 2009/0259786, describes a host-slave system using the SDIO interface in which the slave facilitates data communication between the host and an external device. In that system, the slave receives data packets from the external device and merges the packets into data streams for transfer to the host. Each data stream includes multiple data segments called SDUs (Service Data Units), where each SDU corresponds to the data content of a packet received from the external device. The slave also inserts headers and/or tailers into the data stream being transferred to the host, which include information regarding the slave's status and buffer conditions. On the host side, the host obtains the buffer condition information about the slave from the headers and/or tailers. Using this information, the host determines the amount of data to transmit or receive from the slave, and issues transfer commands to the slave accordingly. This scheme can significantly reduce inter-command delay.

To enhance performance, embodiments of the present invention provide a further improved host-slave system in which the host utilizes direct memory access (DMA) techniques to unpack the data stream received from the slave in an efficient manner. More specifically, when the slave transfers a stream of data containing multiple SDUs to the host, the slave inserts headers and/or tailers into the data stream which contain information regarding the data sizes of SDUs ready to be transferred to the host. The host utilizes the data size information to setup subsequent data transfers using direct memory access (DMA) such that the host can directly unpack the stream of data from the slave into individual packets as the data stream is received by the host, without performing memory copy.

In a conventional device that does not implementing the DMA technique described in the present disclosure, entire streams of data would have to be received into a buffer memory of the host, and the buffered data would then be copied out packet-by-packet, in order to unpack the data stream into individual packets for further processing. This is referred to as memory copy. Memory copy requires a relatively large sized buffer area to be allocated for temporarily holding the data stream. In addition, it requires extra host CPU effort for data copy from this buffer to the buffers that hold individual packets. Using the DMA technique described herein, the stream of data is unpacked into packets as the data stream is received from the slave without performing memory copy. Embodiments of the present invention are described in more detail with reference to FIGS. 1-5.

Figure 1:
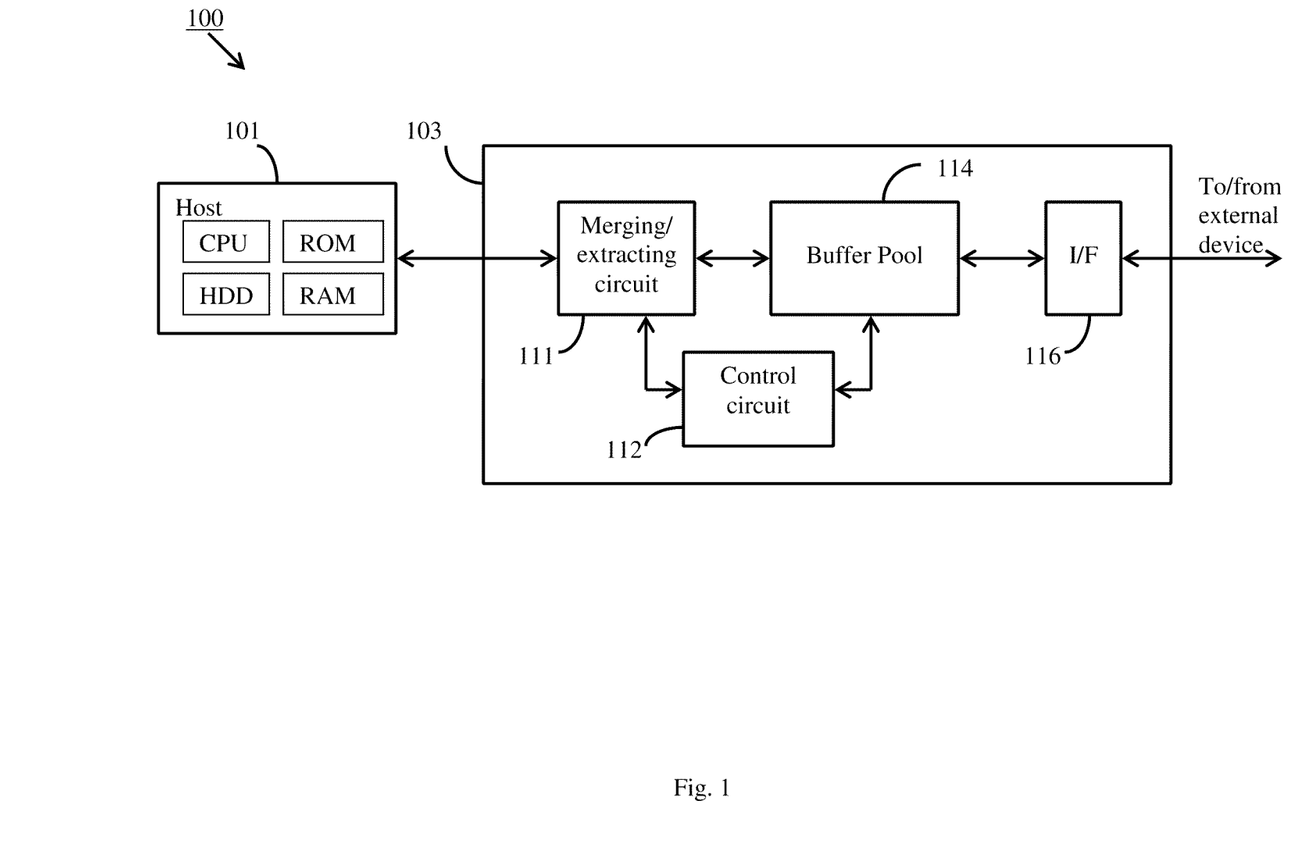
FIG. 1 is a block diagram of a host-slave data transfer system according to an embodiment of the present invention.

FIG. 1 is a schematic block diagram illustrating a data transfer system 100 according to an embodiment of the present invention. The data transfer system 100 includes a host (master) device 101 and a slave device 103 connected in a host-slave relationship. In a practical application, the host may be a PDA, a laptop computer, a cell phone, etc., and the slave device may be a GPS receiver, a Wi-Fi or Bluetooth adapters, a modem, an Ethernet adapter, a barcode reader, an IrDA adapter, an FM radio tuner, a TV tuner, an RFID reader, a digital camera, a mass storage device such as a hard drive, etc. The host has a processor (CPU) and memories for storing program code and other data, such as a RAM, a ROM, a mass storage device such as a hard disk drive, etc. In many applications, the slave device communicates with or receives signals from an external device, such as GPS satellites, another Wi-Fi or Bluetooth device, a network, etc., using a communication protocol or data format compatible with the external device.

In one particular embodiment, the slave device has a SD (Secure Digital) card form factor. In other words, it has a connector with a physical shape and pin configuration that can be accepted by an SD card slot. In the example described below, the slave device is a communication adapter that facilitates data communication between the host 101 and an external device (not shown).

The slave device 103 includes a merging circuit 111, a control circuit 112, a buffer pool 114 (or simply referred to as the buffer), and an interface circuit 116. Other components of the slave 103 not pertinent to the instant invention are not shown. The buffer 114 temporarily stores data transferred between the external device and the host 101. The interface circuit 116 controls the data transmission with the external device using appropriate communication protocols or data formats compatible with the external device.

The control circuit 112 manages the buffer pool 114 and controls the merging circuit 111. During a receive transaction (i.e. receiving data from the external device by the host via the slave device), the control circuit 112 generates header and/or tailer as will be described in more detail later. The header and/or tailer are inputted to the merging circuit 111. The merging circuit 111 merges data in the buffer pool (i.e. data received from the external device) and the header and/or tailer to generate a stream of merged data according to a predetermined data format, and transmits the merged data to the host device 101.

Figure 2:
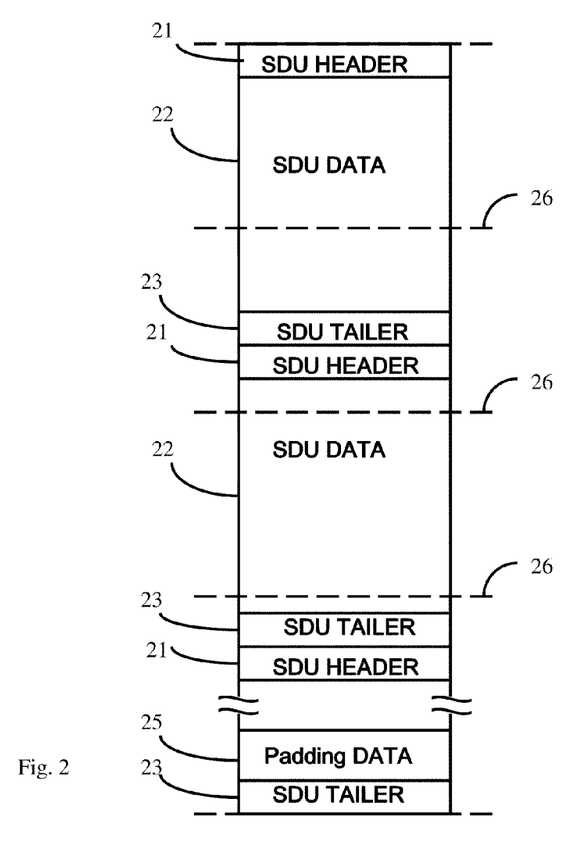
FIG. 2 is a schematically illustrates an example for the data format of a data stream transmitted from the slave to the host.

FIG. 2 is a schematic diagram illustrating an example for the data format of the data stream which is generated by the merging circuit 111 and transmitted to the host device 101. The data received from the external device are typically packet-based data. The interface circuit 116 extracts the data content ("pure data") from the data packets and places the pure data in the buffer 114. In the data structure shown in FIG. 2, each SDU (Service Data Unit) data segment 22 corresponds to the data content of a packet received from the external device. The merging circuit 111 adds a header 21 ("SDU header") and a tailer 23 ("SDU tailer") for each SDU data segment 22, and merges multiple SDU data segments together with their headers and tailers into a data stream. A data stream is a continuous stream of data that is transferred to the host in response to one transfer command from the host.

The dashed lines 26 in FIG. 2 indicate boundaries of blocks defined by the SDIO protocol. In SDIO, as well as many other protocols, the host device transfers data in blocks. SDIO uses multiple blocks in a transaction to access mass data; the block size is configurable between the slave and the host and ranges from 1 B to 2 KB. Each data transfer command issued by the host specifies a number of blocks to be transferred. As shown in FIG. 2, in a data stream generated by the merging circuit 111 of the slave 103, the block boundaries have no relationship to the boundaries of the SDU data segments 22, since the size of SDU data segment is determined by the packet size. The SDU data segment may have different sizes. Thus, when the host requires a transaction to receive a certain number of SDIO blocks, these blocks may contain one, or more, or a part of an SDU. The block boundaries (dashed lines 26) may fall anywhere in the data stream, such as inside an SDU data segment 22, inside an SDU header 21, inside an SDU tailer 23, etc. At the end of a data stream, padding data 25 may be added by the slave so that the total amount of data in the data stream makes up the number of blocks specified in the transfer command.

The header 21 and/or tailer 23 are used by the slave 103 to convey various information to the host 101. The header or tailer data may have any desired format. The location of the SDU headers and tailers is not important; they are not required to be located before or after each SDU. More generally, the header and/or tailer may be collectively referred to as the auxiliary segment while the SDU may be referred to as the data segment of the data stream. In the above-mentioned co-pending patent application, the header and/or tailer contains information regarding the slave's status and buffer conditions. According to embodiments of the present invention, the header and/or tailer contains information regarding the size of the SDUs in the data stream, which can be used by the host 101 to set up DMA.

The host 101 implements features specified in the SD Host Controller Standard Specification. This is performed by the CPU executing program code stored in the memory of the host. The SD Host Controller Standard Specification provides that an SD host controller may optionally implement data transfer using DMA. The DMA algorithm defined in the SD Host Controller Standard Specification Version 1.00 is called SDMA (Single Operation DMA); the DMA algorithm defined in the SD Specifications, Part A2, SD Host Controller Simplified Specification, Version 2.00 and Version 3.0 is called Advanced DMA (ADMA) (see sections 1.4 and 1.13 of Version 2.00). Under the ADMA scheme, the host driver can program a list of data transfers between system memory and the SD slave to a descriptor table before executing ADMA. This enables ADMA to operate without interrupting the host driver.

Figure 3A:
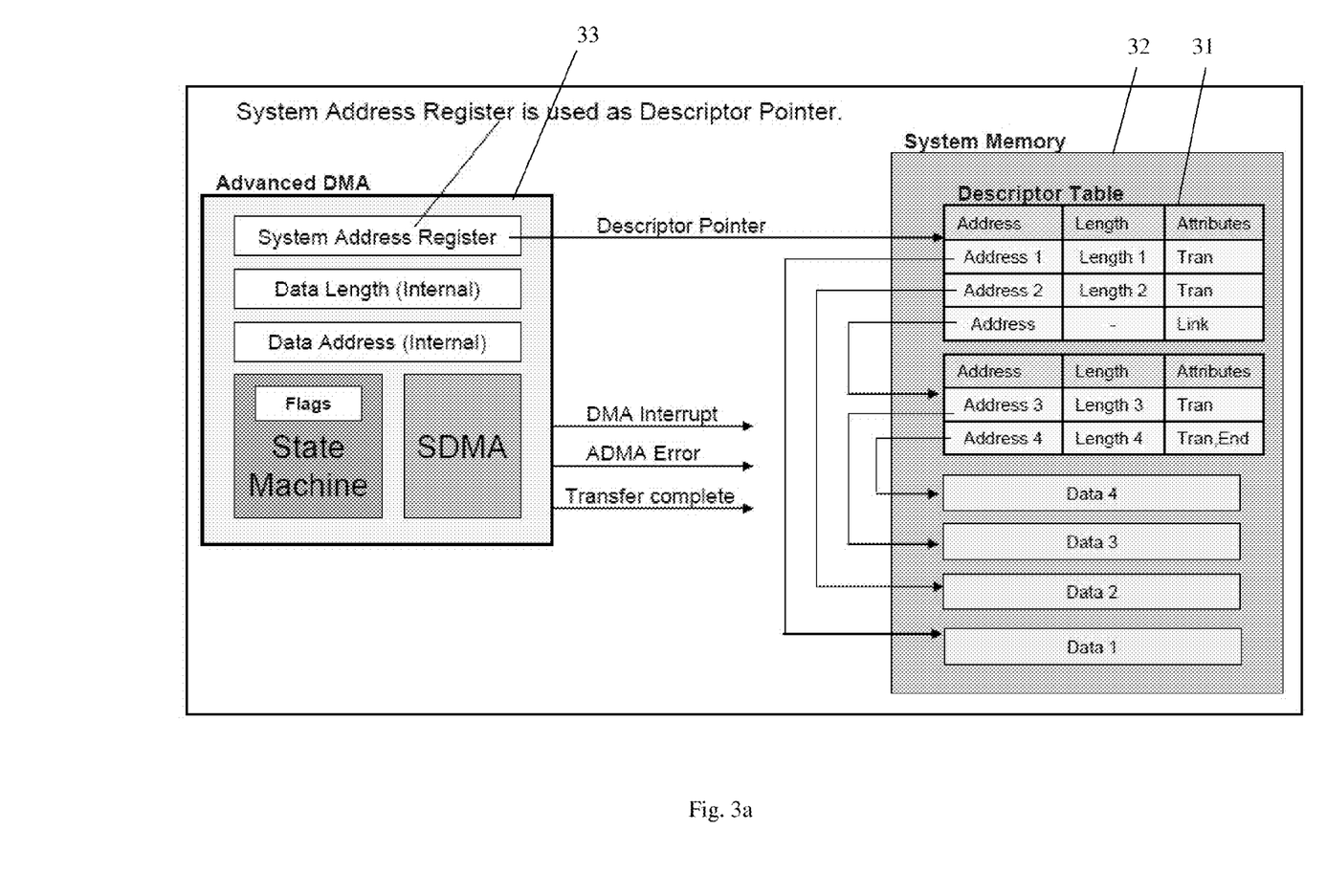
FIG. 3a is a schematic diagram of ADMA2 compliant with SD Host Controller Simplified Specification, Version 2.00.

FIG. 3a (adapted from FIG. 1-9 of the SD Host Controller Simplified Specification, Version 2.00) schematically illustrates ADMA2, which is one of the two versions of ADMA. A descriptor table 31 is created in the system memory 32 by the host driver. Each descriptor line (one executable unit) consists of an address, a length and an attribute field. The attribute specifies operation of the descriptor line, such as data transfer ("Tran"), link, etc. In the example schematically illustrated in FIG. 3, the first line of the description table, "Address 1 Length 1 Tran", when executed, will cause an amount of transferred data from the slave to be stored in the system memory as "Data 1". The third line of the description table "Address—Link", when executed, will cause the descriptor pointer to move to another address which contains another line of the descriptor table. The structure of the ADMA section 33 includes the following hardware components: SDMA, State Machine, and Registers circuits (see FIG. 3a).

The link list feature of the ADMA can be used to unpack data streams containing multiple SDUs concatenated by the slave. A link descriptor, i.e. a descriptor whose Attribute value is Link, can link to another descriptor table specified in the Address field of the link descriptor. For example, in the example shown in FIG. 3, the third line of the descriptor table is a link descriptor. Using link descriptors, many descriptor tables may be linked together so that long data streams can be unpacked.

Figure 3B:
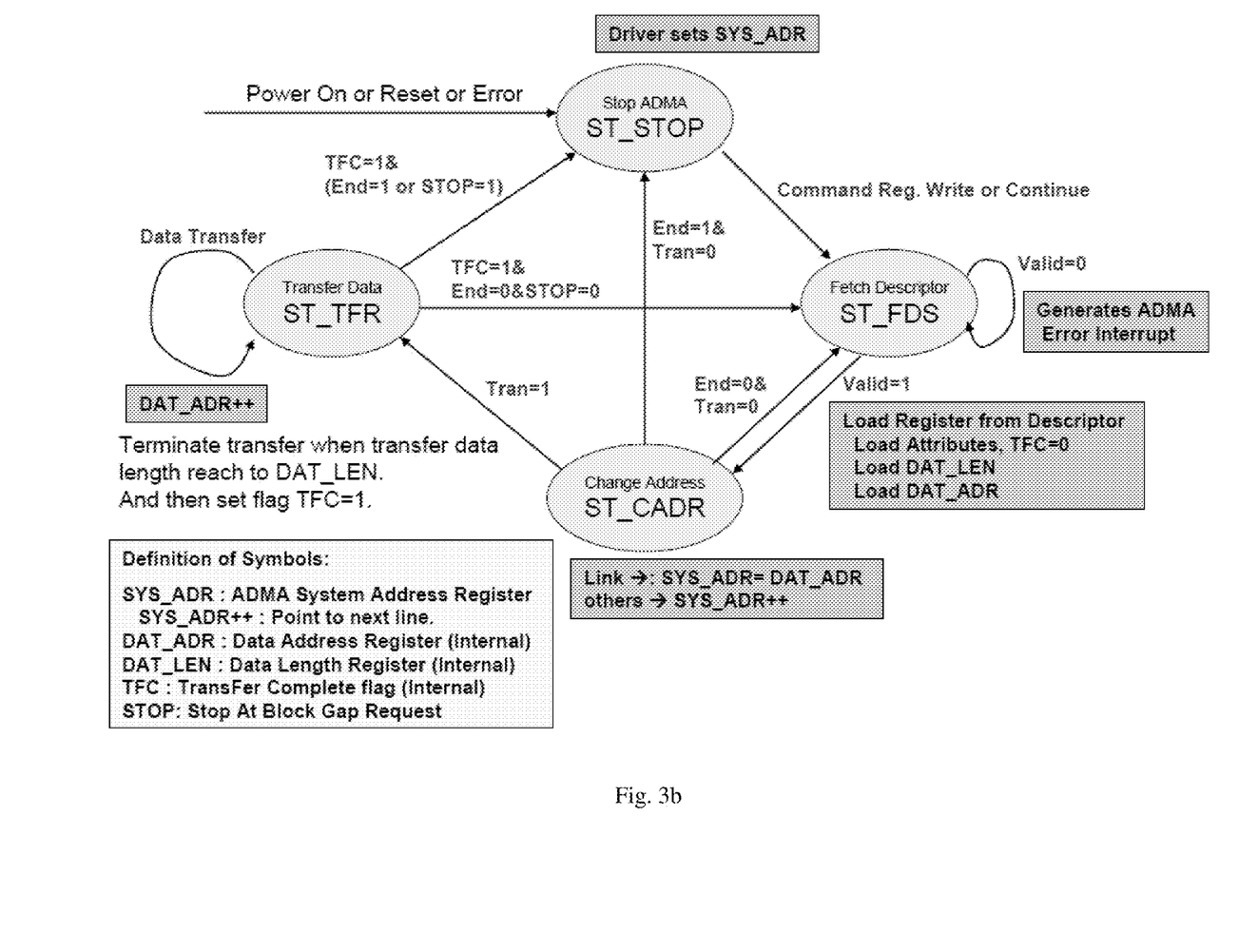
FIG. 3b is a state diagram and FIG. 3c explains the operation of each state.
Figure 3C:
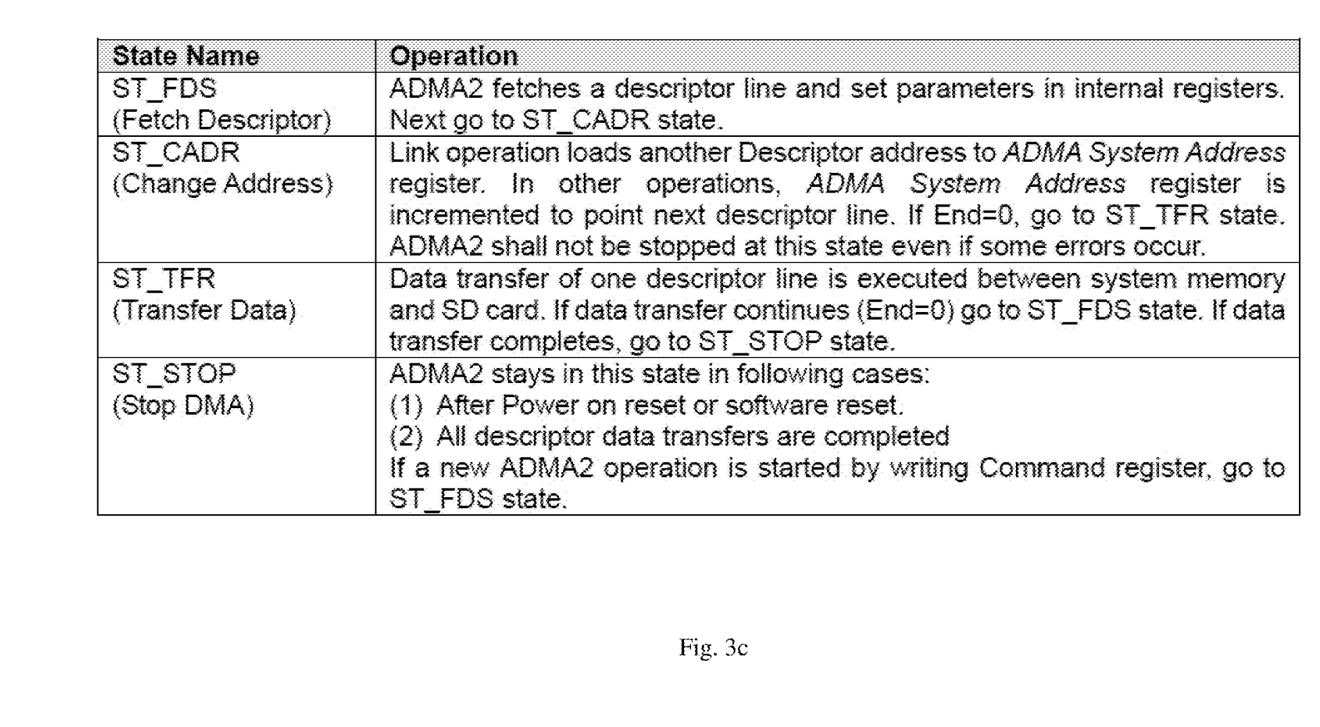

FIG. 3b (adapted from FIG. 1-12 of the SD Host Controller Simplified Specification, Version 2.00) shows a state diagram of ADMA2. FIG. 3c (adapted from Table 1-12 of the SD Host Controller Simplified Specification, Version 2.00) explains the operation of each state. Four states are defined: Fetch Descriptor state, Change Address state, Transfer Data state, and Stop DMA state. In the Fetch Descriptor state, ADMA2 fetches a descriptor line and sets parameters in the internal registers, and then goes to the Change Address state. In the Change Address state, the link operation loads another Descriptor address to the ADMA System Address register. In other operations, ADMA System Address register is incremented to point to the next descriptor line. If the End value of the attribute field of the descriptor does not indicate an end (End=0), ADMA2 goes to the Transfer Data state. In the Transfer Data state, data transfer of one descriptor line is executed between the system memory and the slave device. If data transfer continues (End=0), ADMA2 goes to the Fetch Descriptor state. If data transfer completes, ADMA2 goes to the Stop DMA state. ADMA2 stays in the Stop DMA state in the following cases: (1) After Power On reset or software reset; and (2) All descriptor data transfers are completed. When a new ADMA2 operation is started by writing Command register, ADMA2 goes to the Fetch Descriptor state. The above description of the ADMA is specified in the SD Host Controller Simplified Specification, Version 2.00 and is familiar to those skilled in the relevant art.

Figure 4:
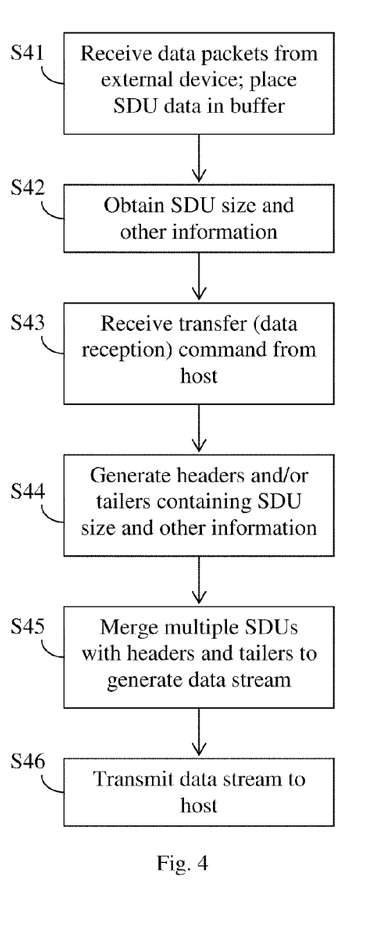
FIG. 4 shows the process executed by the slave and
FIG. 5 shows the process executed by the host.
Figure 5:
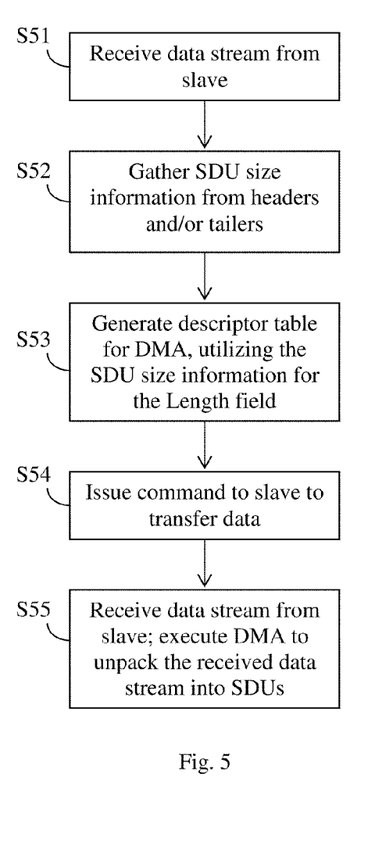

FIGS. 4 and 5 are flow diagrams illustrating a data transfer process in which the host receives data from the slave according to an embodiment of the present invention. FIG. 4 is a process executed by the slave 103 and FIG. 5 is a process executed by the host 101.

As shown in FIG. 4, the slave 103 receives data from the external device and stores it in a buffer (step S41). As mentioned earlier, the data received from the external device are typically packet-based data, and the data content ("pure data") is extracted from the data packets and placed in the buffer as SDUs. The control circuit 112 obtains information regarding the size of the SDUs, as well as buffer condition information and other status information about the slave (step S42). When the slave receives a transfer command from the host (step S43), in this case a command to receive data, the control circuit 112 generates headers and/or tailers containing the SDU size information and other information (step S44). The order of steps S42, S43 and S44 is not important. The merging circuit 111 then merges multiple SDUs with the headers and tailers to generate a data stream (step S45). The data stream is transferred to the host (step S46). This process (steps S41 to S46) is repeated so that additional data received from the external device is transferred to the host.

It should be noted that the SDU size information in the header or tailer does not describe the size of the SDUs being transferred in the current data stream; rather, the size information pertains to SDUs that are not being transferred in the current data stream but are ready to be transferred later. As described below, the host uses the SDU size information contained in the headers/tailers of a data stream to set up DMA for receiving subsequent data streams.

On the host side, as shown in FIG. 5, the host 101 receives a data stream from the slave 103 (step S51). As described above, the data stream includes headers and/or tailers containing information about the sizes of SDUs that are ready to be transferred from the slave to the host. Again, note that the sizes information in the headers and/or tailers does not pertain to the SDUs in the current data stream. The host gathers such SDU size information from the headers and/or tailers (step S52). The host can then configure the host controller DMA engine based on the SDU size information to transfer some of the ready SDUs. More specifically, the host generates a descriptor table, by specifying the Address, Length and Attributes of each line of the descriptor table, such that each line corresponds to one SDU to be transferred (step S53). The Length field of the descriptor lines is specified based on the SDU size information previously gathered in step S52. For example, the Length value may be the length of one ready SDU plus the length of a header and the length of a tailer. After the descriptor table is set up, the host 101 issues a read command to the slave to transfer multiple SDUs (step S54). In response to the transfer command, the slave will transfer the requested data in a data stream. The host executes DMA (e.g. ADMA described above) to unpack the data stream from the slave into individual SDUs and store the SDUs in the host's system memory (step S54). By executing DMA, the data stream from the slave is directly unpacked into individual SDUs without performing memory copy.

Note that in the process flow shown in FIG. 5, step S51, a step of receiving a data stream from the slave, may itself use an DMA operation. In step S55, the data stream received from the slave may contain SDU size information in headers and/or tailer regarding other additional SDUs in the slave buffer, and the host will gather the SDU size information to prepare the DMA descriptor table for further data transfers. Steps 52-55 may be repeated to transfer additional data from the slave.

The method executed by the host 101, described in FIG. 5, may be implemented in a host SD driver program. The implementation does not require any modification of the hardware structure of the host 101. The driver program cooperates with the SD slave 103 to accomplish the data transfer.

In the method described above, the slave uses headers and/or tailers inserted in a first data stream to transmit the data segment size information to the host to enable to host to set up DMA for a second, later data stream. More generally, the slave and host can use any appropriate communication method, generally referred to as an outband channel, to communicate the data segment size information.

It should be noted that although the SDIO host-slave system is used as an example in the above descriptions, the invention is not limited to SDIO, and can be applied in other host-slave interface systems. It is particularly beneficial in a host-slave system compliant with a protocol that does not inherently offer flow control.

It will be apparent to those skilled in the art that various modification and variations can be made in the host-slave data transfer system and related method of the present invention without departing from the spirit or scope of the invention. Thus, it is intended that the present invention cover modifications and variations that come within the scope of the appended claims and their equivalents.

What is claimed is:

1. A data transfer method implemented in a host of a host-slave system, comprising:
   receiving one or more data streams from the slave, the data streams containing a first plurality of data segments and a plurality of auxiliary segments;
   obtaining, by a processor, data segment size information from at least a portion of the plurality of auxiliary segments, the data segment size information specifying sizes a size of each of a second plurality of data segments stored in the slave, the second plurality of data segments being different from the first plurality of data segments;
   generating, one or more descriptor tables comprising a plurality of descriptors each defining a data transfer between the slave and a system memory of the host, each of the plurality of descriptors specifying an address in the system memory and a length of data to be transferred, wherein the length specified in each of the descriptors is based partially on the size of one of the second plurality of data segments obtained in the obtaining step;
   issuing a transfer command to the slave to transfer the second plurality of data segments as a data stream;
   executing, a direct memory access according to the descriptor tables to store individual ones of the second plurality of data segments in the data stream from the slave in the system memory of the host at the specified addresses, wherein execution of each descriptor of the descriptor tables causes one of the second plurality of data segments to be stored in the system memory.

2. The method of claim 1, wherein the descriptor tables further include one or more additional descriptors, each additional descriptor defining a link to another descriptor table.

3. The method of claim 1, where the auxiliary segments are headers located before the respective data segments or tailers located after the respective data segments.

4. The method of claim 1, wherein the host-slave system uses an SDIO (Secure Digital Input Output) interface.

5. A host device in a host of a host-slave system, comprising:
   a processor; and
   a system memory storing data wherein the processor executes a data transfer process which comprises:
   receiving one or more data streams from the slave, the data streams containing a first plurality of data segments and a plurality of auxiliary segments;
   obtaining data segment size information from at least a portion of the plurality of auxiliary segments, the data segment size information specifying a size of each of a second plurality of data segments stored in the slave, the second plurality of data segments being different from the first plurality of data segments;
   generating one or more descriptor tables comprising a plurality of descriptors each defining a data transfer between the slave and the system memory of the host, each of the plurality of descriptors specifying an address in the system memory and a length of data to be transferred, wherein the length specified in each of the descriptors is based partially on the size of one of the second plurality of data segments obtained in the obtaining step;
   issuing a transfer command to the slave to transfer the second plurality of data segments as a data stream;
   executing a direct memory access according to the descriptor tables to store individual ones of the second plurality of data segments in the data stream from the slave in the system memory of the host at the specified addresses, wherein execution of each descriptor causes one of the second plurality of data segments to be stored in the system memory.

6. The host device of claim 5, wherein the descriptor tables further include one or more additional descriptors, each additional descriptor defining a link to another descriptor table.

7. The host device of claim 5, where the auxiliary segments are headers located before the respective data segments or tailers located after the respective data segments.

8. The host device of claim 5, wherein the host-slave system uses an SDIO (Secure Digital Input Output) interface.

9. A slave device adapted for communicating with a host device in a host-slave system, comprising:
   a buffer for storing data, the data comprising a first plurality of data segments and a second plurality of data segments;
   a control circuit coupled to the buffer for obtaining data segment size information specifying sizes of each of the second plurality of data segments in the buffer, the second plurality of data segments being different from the first plurality of data segments; and
   a merging circuit coupled to the buffer and the control circuit, for generating a first data stream and transferring the first data stream to the host device in response to a data transfer command from the host device, the first data stream containing the first plurality of data segments and a plurality of auxiliary segments, wherein the auxiliary segments include the data segment size information specifying sizes of each of the second plurality of data segments, and for generating a second data stream containing the second plurality of data segments and transferring the second data stream to the host device after transferring the first data stream.

10. The slave device of claim 9, wherein the data is received from an external device, the slave device further comprising an interface circuit for controlling data transmission between the slave device and the external device using a predetermined communication protocol, wherein the data received from the external device includes a plurality of data packets, wherein the interface circuit extracts data content from each data packet and places the extracted data content in the buffer as one of the plurality of data segments.

11. The slave device of claim 9, wherein the merging circuit transfers the data stream to the host in a block-based manner.

12. The slave device of claim 9, where the auxiliary segments are headers located before the respective data segments or tailers located after the respective data segments.

13. The slave device of claim 9, wherein the host-slave system uses an SDIO (Secure Digital Input Output) interface.

14. A method implemented in a slave device of a host-slave system to facilitate communication of data with a host device, comprising:
   storing data in a buffer of the slave device, the data comprising a first plurality of data segments and a second plurality of data segments;
   obtaining data segment size information specifying sizes of each of the second plurality of data segments in the buffer, the second plurality of data segments being different from the first plurality of data segments;
   generating a first data stream and transferring the first data stream to the host device in response to a data transfer command from the host device, the first data stream containing the first plurality of data segments and a plurality of auxiliary segments, wherein the auxiliary segments include the data segment size information specifying sizes of each of the second plurality of data segments; and generating a second data stream containing the second plurality of data segments and transferring the second data stream to the host device after transferring the first data stream.

15. The method of claim 14, wherein the data is received from an external device, the method further comprising:

controlling data transmission between the slave device and the external device using a predetermined communication protocol, wherein the data received from the external device includes a plurality of data packets, the controlling step including extracting data content from each data packet and placing the extracted data content in the buffer as one of the plurality of data segments.

16. The method of claim 14, wherein the in the transferring step, the data stream is transferred to the host in a block-based manner.

17. The method of claim 14, where the auxiliary segments are headers located before the respective data segments or tailers located after the respective data segments.

18. The method of claim 14, wherein the host-slave system uses an SDIO (Secure Digital Input Output) interface.

* * * * *